(12) United States Patent
Li et al.

(10) Patent No.: US 9,488,960 B2
(45) Date of Patent: Nov. 8, 2016

(54) METHODS AND APPARATUSES FOR MANUFACTURING ULTRALONG FIBER BRAGG GRATINGS WITH ARBITRARY REFLECTION WAVELENGTH

(71) Applicant: TSINGHUA UNIVERSITY, Beijing (CN)

(72) Inventors: Yuhang Li, Beijing (CN); Zhongyang Xu, Beijing (CN); Lijun Wang, Beijing (CN)

(73) Assignee: Tsinghua University, Beijing (CN)

(*) Notice: Subject to any disclaimer, the term of this patent is extended or adjusted under 35 U.S.C. 154(b) by 243 days.

(21) Appl. No.: 13/892,043

(22) Filed: May 10, 2013

(65) Prior Publication Data

US 2014/0204436 A1   Jul. 24, 2014

(30) Foreign Application Priority Data

Jan. 21, 2013   (CN) .......................... 2013 1 0020705

(51) Int. Cl.
*G03H 1/02* (2006.01)
*G03H 1/04* (2006.01)
*G02B 6/02* (2006.01)

(52) U.S. Cl.
CPC ........ *G03H 1/0248* (2013.01); *G02B 6/02133* (2013.01); *G03H 1/0236* (2013.01); *G02B 6/02085* (2013.01); *G03H 2001/0439* (2013.01); *G03H 2001/0482* (2013.01); *G03H 2222/15* (2013.01); *G03H 2270/20* (2013.01)

(58) Field of Classification Search
CPC .. G03H 1/0005; G03H 1/04; G03H 2223/16; G03H 2001/026; G03H 1/0248; G03H 1/0236; G03H 2001/0439; G03H 2001/0482; G03H 2222/15; G03H 2270/20; G02B 5/0252; G02B 6/00; G02B 6/0018; G02B 6/0035; G02B 6/0016; G02B 6/02085; G02B 6/02133; G02B 6/351; G02B 6/356; G02B 6/4218; G02B 6/34; G02B 6/02123; G02B 5/203; G02B 5/1861; G02B 6/2931; G02B 6/29311; G02B 6/29317; G02B 6/29328; G02B 6/02057; B29D 11/00769
USPC ............ 359/3, 8, 9, 10, 15, 17, 34, 35, 566; 385/10, 37
See application file for complete search history.

(56) References Cited

U.S. PATENT DOCUMENTS

| | | | |
|---|---|---|---|
| 2002/0044358 A1* | 4/2002 | Laming et al. ............... | 359/570 |
| 2004/0156586 A1* | 8/2004 | Sahlgren et al. ............. | 385/37 |
| 2007/0109949 A1* | 5/2007 | Efimov .................... | G03H 1/30 369/118 |

* cited by examiner

*Primary Examiner* — Bumsuk Won
*Assistant Examiner* — Wen Huang
(74) *Attorney, Agent, or Firm* — Osha • Liang LLP

(57) ABSTRACT

Described are methods and apparatuses for manufacturing ultralong fiber Bragg gratings with arbitrary reflection wavelength. The method may include: generating two holographic beams entering a fiber with a certain intersection angle there-between from one side of the fiber and forming holographic interference fringes in the fiber, driving the two holographic beams to scan along the fiber by a motorized translation stage controlled by a computer; and adjusting the intersection angle between the two beams by motorized rotation stages or motorized mirror mounts controlled by the computer. The present disclosure can be applied in manufacturing ultralong fiber Bragg gratings with arbitrary reflection wavelength, such as narrow-reflection-band gratings, chirped gratings, and apodized gratings, etc.

7 Claims, 4 Drawing Sheets

METHODS AND APPARATUSES FOR MANUFACTURING ULTRALONG FIBER BRAGG GRATINGS WITH ARBITRARY REFLECTION WAVELENGTH

TECHNICAL FIELD

The present disclosure generally relates to a technical field of optoelectronics and fiber communication, and in particular to methods and apparatuses for manufacturing fiber Bragg gratings. More particularly, the present disclosure relates to methods and apparatuses for manufacturing ultralong fiber Bragg gratings with arbitrary reflection wavelength.

BACKGROUND

Fiber Bragg gratings (FBGs) have attracted much attention since K. O. Hill et al. inscribed a FBG in a silica fiber successfully using standing-wave technique in 1978. Nowadays, FBGs have been widely used in optical fiber sensing, optical fiber communications and fiber lasers due to advantages such as small size, light weight, high sensitivity, and high resistance to electromagnetic interference. Researchers have developed many kinds of FBGs, including apodized FBGs, high-reflection FBGs, chirped FBGs, narrow-reflection-band FBGs, and phase-shifted FBGs, etc., for various applications. However, the gratings manufactured by the standing-wave technique can only operate near the inscription laser wavelength and the photosensitivity of the fiber decreases dramatically at wavelengths larger than 500 nm. As a result, the standing-wave technique has not been widely adopted. Many other manufacturing techniques are developed, including:

(1) Holographic Inscription Technique

Proposed by G Meltz et al., the holographic inscription technique can be used for manufacturing high-quality FBGs. The most prominent advantage of the holographic inscription technique is the capability of adjusting the grating period in a broad range conveniently by changing the angle between the two interference beams, so as to change the reflection wavelength. However, the gratings manufactured using this technique cannot be very long because the inscription beam spot cannot be expanded too much due to the limited power of the inscription ultraviolet laser. Moreover, it is not easy to manufacture chirped gratings or apodized gratings using this technique, and thus its application is very limited.

(2) Phase-Mask Technique

K. O. Hill et al. proposed a phase-mask technique in 1993. This technique is non-interferometric in nature, and thus greatly alleviates requirements for the coherence of ultraviolet beam and for the low-vibration manufacture environment. It also substantially lowers the difficulties in manufacturing FBGs and improves the manufacturing efficiency. Moreover, excimer lasers with higher energy and larger beam spot can be employed in this technique and thus it is suitable for mass-production. Since characteristics (e.g., length, uniformity, and period, etc.) of FBGs are mainly determined by the phase-mask, this technique can be used to manufacture chirped FBGs and phase-shifted FBGs, etc., by employing suitable masks. However, for a given phase-mask, although the grating period can be adjusted by, e.g., applying pre-stress to the fiber during the fabrication or adjusting divergence of the inscription laser beam, the adjustable range is very limited. Furthermore, the phase masks for FBGs with various reflection wavelengths are costly, and thus it is inconvenient for the manufacture of FBGs with arbitrary reflection wavelength.

(3) Point-by-Point Inscription Technique

According to this technique, the fiber grating can be manufactured by exposing a short section of the fiber to a focused single pulse and moving the fiber by a distance of the grating period before a next pulse arrives. This technique can be adaptively applied in manufacturing various kinds of fiber gratings, such as FBGs with various reflection wavelengths, chirped FBGs, and phase-shifted FBGs, etc., by precisely controlling the moving distances. However, this technique has a few limitations despite its high flexibility. First of all, it is time-consuming and thus is only suitable for manufacturing short FBGs. Second, this technique requires accurate movement control of the fiber, and the accumulation of movement errors makes it impractical for long gratings. Third, it is not an easy task to focus the laser beam to a small spot size that is only a fraction of the grating period, so it is difficult to manufacture FBGs with reflected wavelengths less than 1 μm.

In view of the foregoing techniques, the present disclosure aims to remedy the above drawbacks by providing a method and apparatus suitable for manufacturing various kinds of FBGs, such as apodized FBGs, chirped FBGs, and phase-shifted FBGs, etc., with reflection wavelengths tunable in a large range, and also suitable for manufacturing ultralong FBGs.

SUMMARY

It is an object of the present disclosure to provide methods and apparatuses suitable for manufacturing various kinds of FBGs, such as apodized FBGs, chirped FBGs, and phase-shifted FBGs, etc., and also suitable for manufacturing ultralong FBGs.

In one aspect of the present disclosure, it is provided a method for manufacturing a FBG, including: fixing a fiber; generating two holographic beams entering the fiber with a certain intersection angle there-between from one side of the fiber and forming holographic interference fringes in the fiber, and driving the two beams to scan along the fiber so as to inscribe gratings at different locations of the fiber.

According to one embodiment of the present disclosure, the method may further include: for the manufacture of FBGs with arbitrary reflection wavelengths, adjusting the intersection angle between the two holographic beams to adjust the period of the FBGs.

According to an embodiment of the present disclosure, the method may further include: controlling the intersection angle between the two holographic beams at each inscription point in real time for the manufacture of chirped FBGs.

According to an embodiment of the present disclosure, the method may further include: controlling the scanning speed of the two holographic beams at each inscription point in real time for the manufacture of apodized FBGs.

Besides, the present disclosure also provides an apparatus for manufacturing FBGs: a holographic beam generation device configured to generate two holographic beams entering the fiber with a certain intersection angle there-between from one side of the fiber and forming holographic interference fringes in the fiber.

The apparatus may further include: a translation device configured to drive the two holographic beams to scan along the fiber; a scan control device configured to control the translation device so that the two beams scan along the fiber with a controlled speed; and rotation devices configured to change the intersection angle between the two beams in real time.

According to an embodiment of the present disclosure, the translation device may be a motorized translation stage.

According to an embodiment of the present disclosure, the holographic beam generation device may include a laser, a beamsplitter, and beam steering components, wherein: the laser is employed to generate laser beam; the beamsplitter is configured to divide the laser beam into two beams with identical power; and the beam steering components are configured to guide the laser beam from the laser to the beamsplitter and from the beamsplitter onto the fiber.

According to an embodiment of the present disclosure, the laser may be a frequency-doubled Argon laser or an excimer laser.

According to an embodiment of the present disclosure, the translation device may be configured to mount at least one beam steering component to drive the two holographic beams to scan along the fiber.

According to an embodiment of the present disclosure, the rotation devices may be motorized rotation stages or motorized mirror mounts.

According to an embodiment of the present disclosure, the rotation devices may be configured to mount at least one beam steering component to adjust the intersection angle between the two holographic beams in real time.

The present disclosure has the following advantages over the prior art:

1. The present disclosure can manufacture ultralong FBGs with an arbitrary reflection wavelength using computer-controlled-scanning holographic interference technique. It is advantageous over the phase-mask technique in that the reflection wavelengths can be adjusted arbitrarily in a broad range.

2. The present disclosure is advantageous over the existing holographic inscription technique in that longer FBGs can be obtained under the same laser power. Moreover, various apodization functions can be realized conveniently through accurate control of the scanning speed.

3. The present disclosure is adapted for manufacturing chirped FBGs with a variable chirped function by adjusting the intersection angle between the two holographic beams in real time under the control of a computer program.

EMBODIMENTS

Figure 1:
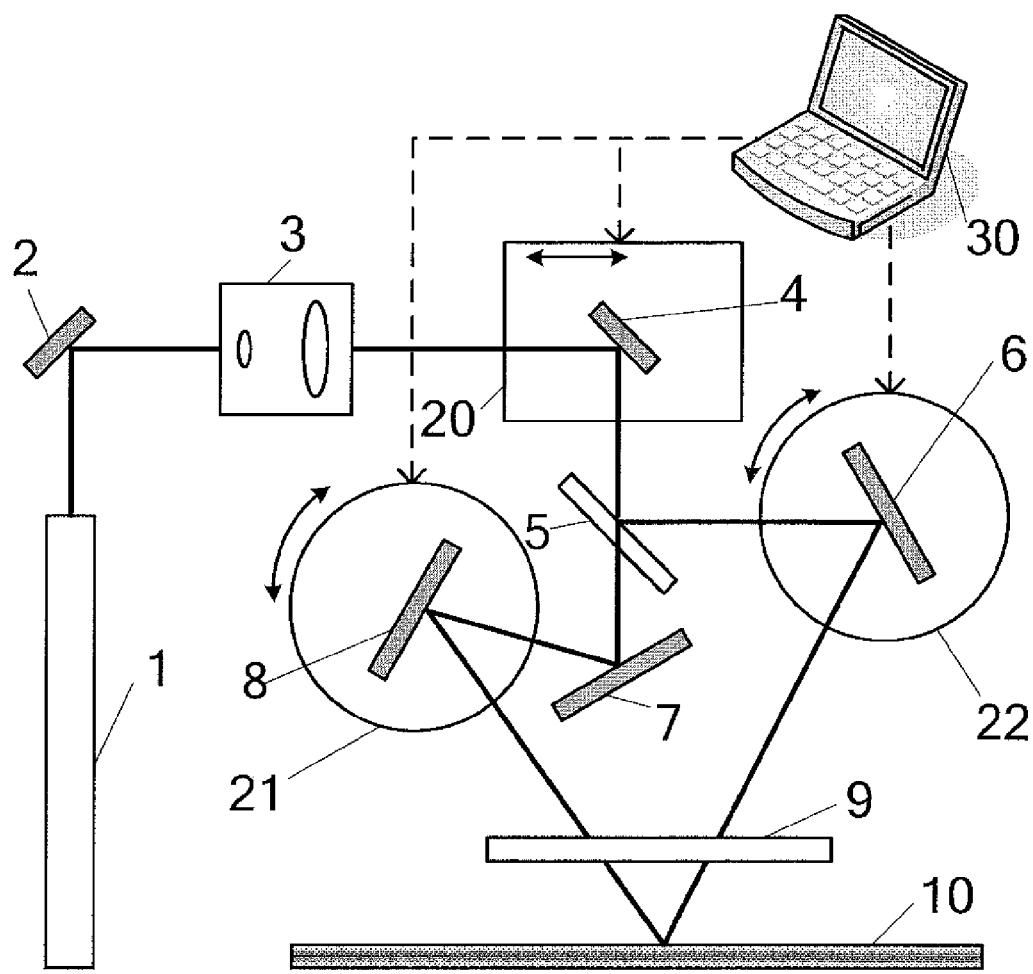
FIG. 1 is a schematic diagram showing the apparatus for manufacturing FBGs according to the first embodiment of the present disclosure.

In order to address the disadvantages and drawbacks of the existing techniques for manufacturing FBGs, the present disclosure provides a method for manufacturing using computer-controlled-scanning holographic interference. In general, the present disclosure uses a motorized translation stage to scan the two holographic beams along the fiber, which enables a wide-beam exposure equivalently. At each inscription point along the fiber, the scanning speed and the intersection angle between two beams are adjusted by a computer-controlled motorized translation stage and motorized rotation stages, respectively, to enable manufacture of various FBGs.

In particular, a method for manufacturing a fiber grating according to the present disclosure includes: holding a fiber; generating two holographic beams entering the fiber with a certain intersection angle there-between from one side of the fiber and forming holographic interference fringes in the fiber, and driving the two holographic beams to scan along the fiber so as to inscribe FBGs at different locations along the fiber.

An apparatus for manufacturing a fiber grating according to the present disclosure includes: a holographic beam generation device configured to generate two holographic beams entering the fiber with a certain intersection angle there-between from one side of the fiber and forming holographic interference fringes in the fiber; a translation device configured to drive the two holographic beams to scan along the fiber; and a scan control device configured to drive the translation device to move at a controlled speed so that the two beams scan accordingly, to inscribe various kinds of FBGs.

The holographic beam generation device may be any device capable of generating holographic beams, e.g., a holographic interferometer. The laser is preferably in an ultraviolet range. In an embodiment, the holographic beam generation device may comprise a laser, a beamsplitter, and beam steering components. The laser is configured to generate a laser beam. The beamsplitter is configured to divide the laser beam into two beams with identical power. The beam steering components are configured to guide the laser beam from the laser to the beamsplitter and from the beamsplitter onto the fiber.

The beam steering components may include one or more high reflection mirrors, beamsplitters, and lenses.

The translation device may be, e.g., a motorized translation stage, and the translation speed can be adjusted accurately, which may be within a range of 0.005-50 mm/s and controlled by a computer or a microprocessor.

In an embodiment, the translation device may be configured to mount at least one beam steering component to drive the two holographic beams to scan along the fiber.

The scan control device is configured to control the translation speed and moving range of the translation device. The scan control device may be any digital processing device such as a computer or a microprocessor.

According to an embodiment of the present disclosure, the method may further include adjusting the intersection angle between the two holographic beams to control the local period of the interference hinges in real time during the inscription.

The apparatus according to the present disclosure may further include rotation devices for adjusting the intersection angle of the two holographic beams. The rotation devices, controlled by the scan control device, are employed to adjust the intersection angle accurately in real time during the inscription.

The rotation devices may be motorized rotation stages or motorized mirror mounts, and the rotation angle of them can be adjusted accurately.

According to an embodiment, the rotation devices are configured to mount at least one beam steering component to adjust the intersection angle between the two beams in real time.

In the following part, the present disclosure will be explained using specific embodiments with reference to the drawings, so that the objects, solutions, and advantages of the present disclosure will become apparent.

Embodiment 1

FIG. 1 is a schematic diagram showing the apparatus for manufacturing a FBG according to the present disclosure. The holographic beam generation device in this apparatus includes: a laser 1; a first reflecting mirror 2; a beam expander 3; a second reflecting mirror 4; a beamsplitter 5; a third reflecting mirror 6, a fourth reflecting mirror 7, a fifth reflecting mirror 8, and a cylindrical lens 9. The translation device is a motorized translation stage 20 configured to mount the second reflecting minor 4. The rotation devices are motorized rotation stages 21 and 22 configured to mount the third and fifth reflecting mirrors 6 and 8, respectively. The scan control device is a computer 30 connected with the motorized translation stage 20 and the motorized rotation stages 21 and 22, and is configured to control the translation of the translation device and the rotation of the rotation device.

In this embodiment, the laser 1 is a UV laser. The laser beam emitted from the laser 1 passes through an adjustable beam expander 3 to generate a laser beam with a beam diameter of 0.5 mm-2 cm. The laser beam is reflected by the second reflecting mirror 4 mounted on the motorized translation stage 20 and enters the beamsplitter 5. The beamsplitter 5 divides the incident UV laser into two beams with identical power, the transmitted part of which is reflected by the fourth reflecting minor 7 and the fifth reflecting minor 8 onto the fiber 10, while the reflection part of which is further reflected by the third reflecting mirror 6 onto the fiber 10.

The two holographic beams, incident onto the fiber, are set to been with the same incident angle by tuning the reflecting minors 6, 7, and 8. The cylindrical lens 9 is employed to focus the UV laser vertically to increase the intensity of the UV laser.

Furthermore, the optical components in the holographic beam generation device may be separate components or integrated as a whole. For example, the optical components may constitute a holographic interferometer.

During the manufacture of FBGs, the scanning speed and range of the motorized translation stage 20 is controlled by the computer 30 to enable manufacturing apodized FBGs and FBGs with various lengths. The reflected wavelength of the grating can be varied in a broad range by adjusting the reflecting mirrors 6 and 8.

The laser 1 is preferably a UV laser with good coherence and the coherence length may be several centimeters. For example, the laser 1 may be a frequency-doubled Argon laser or an excimer laser with a long coherence length.

The motorized translation stage 20 is controlled by a program. Parameters being controlled include: the moving speed at each locations and the total movement distance. The moving speed is preferably 0.005 mm/s-50 mm/s.

The beamsplitter is preferably a 50:50 UV beamsplitter. The cylindrical lens preferably has a focal length of 3 cm-25 cm. The fiber is a standard single-mode fiber, a photosensitive fiber, a hydrogen-loaded fiber, or other photosensitivity-enhanced fibers.

In this embodiment, the two holographic beams are incident on the fiber 10 with a specific intersection angle and form holographic interference fringes. Meanwhile, the computer 30 controls the motorized translation stage 20 so that the holographic beams scan within a certain range. In this way, various FBGs, such as high-reflection FBGs, narrow-reflection-band FBGs, and phase-shifted FBGs, can be manufactured. Furthermore, the intersection angle of the two holographic beams can be accurately adjusted by the motorized rotation stages 21 and 22 in real time, so that the local period of the grating can be adjusted during the inscription, and thus enable the fabrication of chirped fiber gratings.

In the first embodiment, equivalent spot length of the UV laser can be adjusted by changing the scan range of the computer-controlled motorized translation stage so as to manufacture FBGs with different lengths. The grating length is limited only by the coherence length of the laser device and the size of the mirrors, and FBG with a length of up to 10 cm can be manufactured by choosing proper mirror dimensions and laser.

Moreover, apodized FBGs can be manufactured by controlling the scanning speed of the motorized translation stage at each inscription location along the fiber.

During the inscription of FBGs, the local period of the grating can be changed by tuning the reflecting mirrors 6 and 8. FBGs with a specific reflection wavelength can be obtained by fixing the intersection angle between the two holographic beams, and chirped FBGs can be obtained by tuning the intersection angle between the two beams in real time during the inscription.

In addition, phase-shifted FBGs can be obtained via UV post-processing a long FBGs.

Embodiment 2

Figure 2:
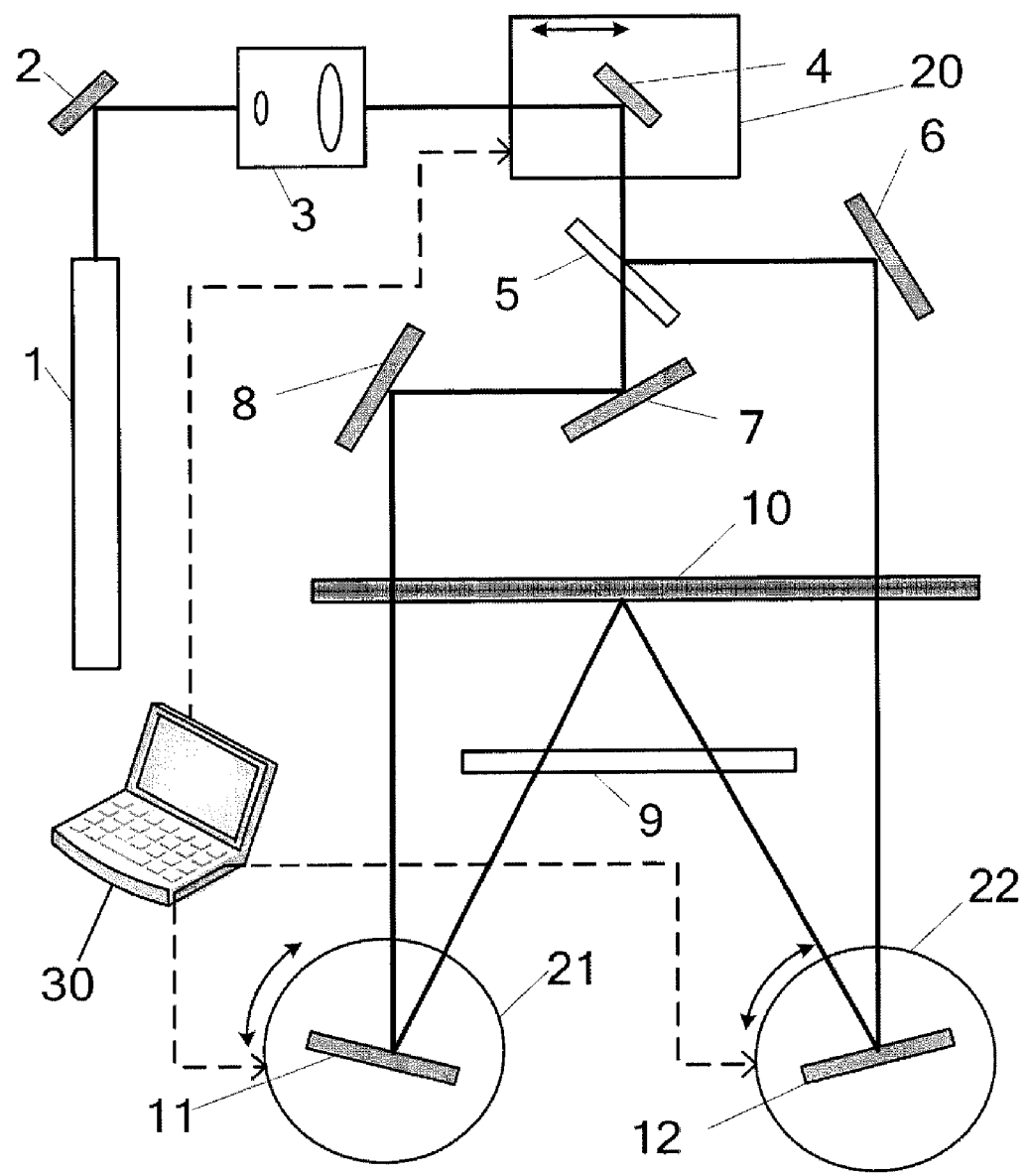
FIG. 2 is a schematic diagram showing the apparatus for manufacturing FBGs according to the second embodiment of the present disclosure.

FIG. 2 is a schematic diagram for the second embodiment of the present disclosure. The apparatus is generally analogous to that of the first embodiment, except that it further includes a sixth reflecting mirror 11 and a seventh reflecting mirror 12 placed on the side of the fiber opposite to the beamsplitter 5 and the third to fifth reflecting minors 6, 7, and 8. The laser beams reflected from the third and fifth reflecting mirrors 6 and 8 are incident on the sixth and seventh reflecting minors 11 and 12, respectively, and then reflected therefrom onto the fiber to form the interference fringes.

The sixth and seventh reflecting mirrors 11 and 12 are added in this embodiment to facilitate the arrangement of the beam steering components after the beamsplitter.

The method and apparatus according to the present disclosure have the following advantages: (1) the reflection wavelength of FBGs can be adjusted in a broad range without using multiple phase-masks; (2) FBGs with various lengths can be manufactured without changing the power of the UV laser, and the maximum grating length is limited only by the dimensions of the optical components and the coherence length of the laser; and (3) various apodized FBGs and chirped FBGs can be manufactured easily.

Figure 3:
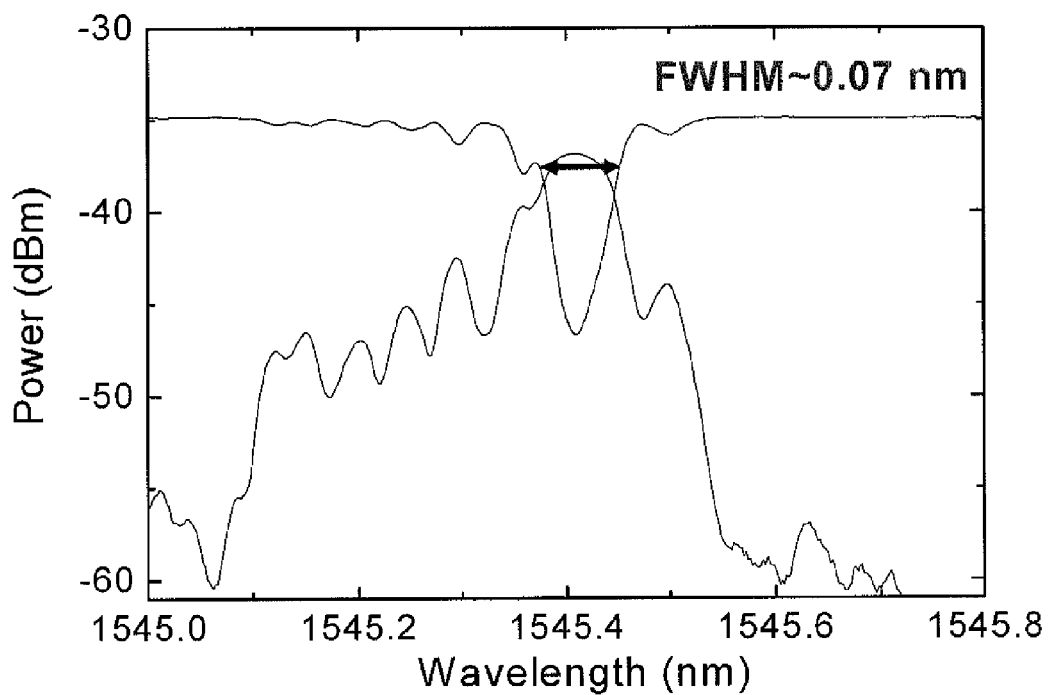
FIG. 3 is the reflection and transmission spectra of a long FBG with a length of about 20 mm manufactured using the apparatus shown in FIG. 1.
Figure 4:
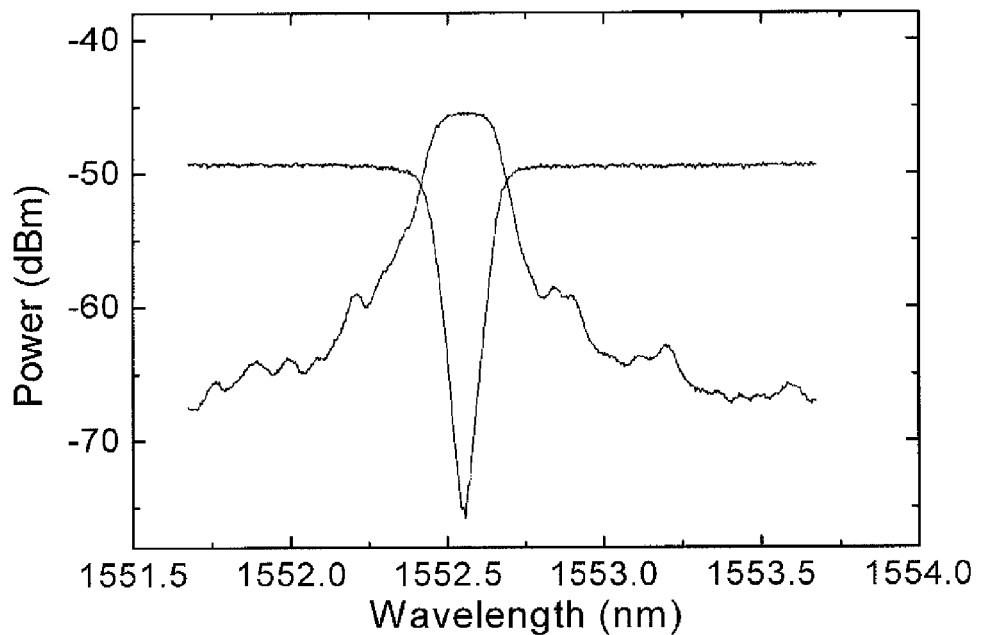
FIG. 4 is the reflection and transmission spectra of an apodized FBG manufactured using the apparatus shown in FIG. 1.
Figure 5:
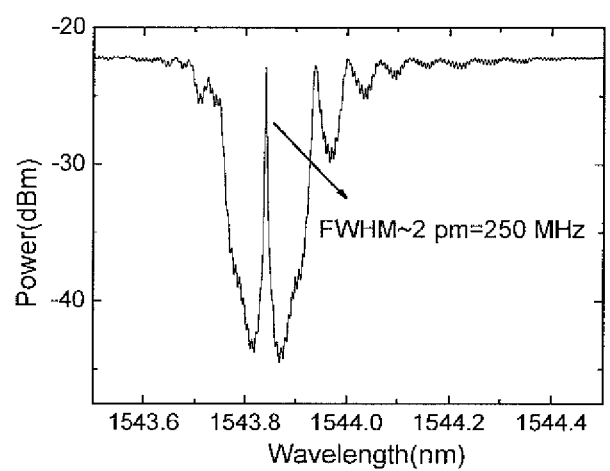
FIG. 5 is the transmission spectrum of a long FBG with a length of about 20 mm manufactured using the apparatus shown in FIG. 1 and then post-processed by ultraviolet light.

It should be noted that the two embodiments presented here are only illustrations for this disclosure. The positions and orientations of the optical components can be changed as required FIG. 3 and FIG. 4 show the reflection and transmission spectra of a narrow reflection-band FBG and those of an apodized FBG, respectively. FIG. 5 shows the transmission spectrum of a phase-shifted FBG.

As shown in FIGS. 3-5, the apparatus and method according to the present disclosure can be applied in manufacturing various FBGs including the narrow reflection-band FBGs with a length of several centimeters, apodized FBGs, and phase-shifted FBGs. The bandwidth of the narrow-reflection-band FBGs can be as narrow as 0.07 nm.

The objects, solutions, and advantages of the present disclosure have been explained using particular embodiments. However, it should be claimed that these are only embodiments of the present disclosure and are not intended to limit the scope of the present disclosure. Any modification, substitution, and improvement within the spirit and principle of the present disclosure will fall within the scope thereof.

What is claimed is:

1. An apparatus for manufacturing a Fiber Bragg Gratings, comprising:
    a holographic beam generation device configured to generate two holographic beams entering a fiber with a certain intersection angle therebetween from one side of the fiber and forming holographic interference fringes in the fiber;
    a translation device configured to mount a scanning mirror thereon and to drive the two holographic beams to scan along the fiber by movement of the scanning mirror so that the holographic beams scan within a certain range and an equivalent spot length of holographic beams can be adjusted by changing the scan range of the scanning mirror;
    a scan control device configured to control the translation device so that the two beams scan within a certain range with a controlled speed; rotation devices configured to change the intersection angle between the two beams in real time; and
    a beam shaping optics in front of the fiber to match an exposure beam shape with the geometry of the fiber, wherein the beam shaping optics comprises a cylindrical lens used to focus both beams into the fiber.

2. The apparatus according to claim 1, wherein the translation device is a motorized translation stage.

3. The apparatus according to claim 1, wherein the holographic beam generation device comprises a laser, a beamsplitter, and beam steering components, wherein:
    the laser is configured to generate a laser beam;
    the beamsplitter is configured to divide the laser light into the two beams with identical power; and
    the beam steering components are configured to guide the laser light from the laser to the beamsplitter and from the beamsplitter onto the fiber.

4. The apparatus according to claim 3, wherein the laser is a frequency-doubled Argon laser or an excimer laser.

5. The apparatus according to claim 1, wherein the translation device is configured to mount at least one beam steering component to drive the two holographic beams to scan along the fiber.

6. The apparatus according to claim 1, wherein the rotation devices are motorized rotation stages or motorized mirror mounts.

7. The apparatus according to claim 1, wherein the rotation devices are configured to mount at least one beam steering component to adjust the intersection angle between the two holographic beams in real time.

* * * * *